UNITED STATES PATENT OFFICE 2,498,431

2- AND 4-HOMOCYCLYL SUBSTITUTED PIPERIDINES

John Lee, Essex Fells, N. J., assignor to Hoffmann-La Roche, Inc., Nutley, N. J., a corporation of New Jersey No Drawing. Application June 13, 1945, Serial No. 599,321

8 Claims. (Cl. 260—293)

This invention relates to piperidines corresponding to the general formula

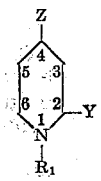

wherein $R_1$ is a hydrocarbon constituent such as an alkyl, alkylene, cycloalkyl, aralkyl, or aryl radical, one of the radicals Y and Z stands for hydrogen while the other one stands for the group

wherein X is a C-homocyclyl radical such as phenyl, naphthyl, cyclohexyl, cyclopentyl; $R_2$ represents hydrogen, alkyl, hydroxy, alkoxy, or acyloxy; and $R_3$ represents alkyl, hydroxy, alkoxy, acyloxy; and to the salts of these piperidines, and to a method of making these compounds.

In the 1-alkyl-2-C-homocyclyl series such piperidines include, for example 1-methyl-2-(o-hydroxyphenyl)-piperidine
1-methyl-2-(m-hydroxyphenyl)-piperidine
1-methyl-2-(p-hydroxyphenyl)-piperidine and the corresponding 2-ortho, meta, and para-methoxy, acetoxy, dimethylcarbamoxy, methylcarbamoxy, ethylcarbamoxy, methylphenylcarbamoxy, butylcarbamoxy, propoxy, benzoxy derivatives; also the 1-ethyl compounds corresponding to the 1-methyl derivatives referred to above. In addition, this series includes 1-methyl-2-(m-methoxyphenyl)-piperidine
1-methyl-2-(6'-methoxy-2'-naphthyl)-piperidine
1-methyl-2-(6'-hydroxy-2'-naphthyl)-piperidine
1-ethyl-2-(6-methoxy-2'-naphthyl)-piperidine
1-ethyl-2-(6-hydroxy-2'-naphthyl)-piperidine
1-cyclohexyl-2-(m-dimethylcarbamoxyphenyl)-piperidine The corresponding 4-C-homocyclyl derivatives are for instance 1-allyl-4-(p-methoxyphenyl)-piperidine
1-methyl-4-(6'-methoxy-4'-naphthyl)-piperidine
1-methyl-4-(6'-hydroxy-4'-naphthyl)-piperidine
1-ethyl-4-(6-methoxy-4'-naphthyl)-piperidine
1-ethyl-4-(6-hydroxy-4'-naphthyl)-piperidine
1-butyl-4-p-tolyl-piperidine 1-benzyl-4-(p-methoxyphenyl)-piperidine
1-phenyl-4-(m-methoxyphenyl)-piperidine
1-methyl-4-(p-methoxyphenyl)-piperidine
1-methyl-4-(p-dimethylcarbamoxyphenyl)-piperidine
1-methyl-4-(3',4'-dimethoxyphenyl)-piperidine In my co-pending application, Serial No. 585,795, filed March 30, 1945, now abandoned, I have shown the preparation of N-tertiary-4-C-substituted homocyclyl-4-hydroxy piperidines by the reaction between N-tertiary-4-piperidones and C-homocyclyl magnesium halides. In the preparation of the compounds described in the present application N-tertiary-4-C-substituted homocyclyl-4-hydroxy piperidines are dehydrated by use of a suitable agent such as $KHSO_4$ or HBr, and the resulting N-tertiary-4-C-substituted homocyclyl-1,2,5,6-tetrahydropyridines reduced with hydrogen in the presence of a metal catalyst to the corresponding N-tertiary-4-C-substituted homocyclyl piperidines. The substituents in the homocyclyl nucleus may then be transformed, as for example alkoxy to hydroxy or acyloxy, by the usual procedures. The reaction scheme is illustrated for instance by the following example

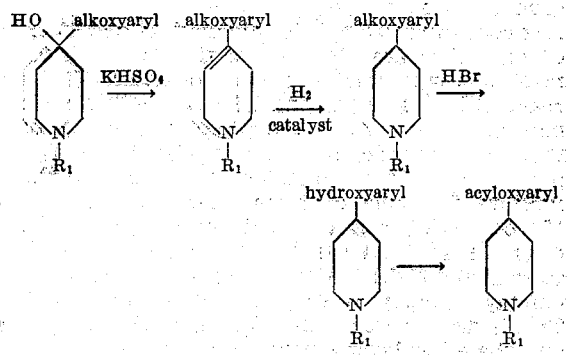

The compounds derived from N-tertiary-2-piperidones are similarly prepared. The 2-piperidones, which may be made according to the method of Räth, Annalen der Chemie, vol. 489, pages 113 to 117, are reacted for instance with ortho, meta, or para substituted aryl magnesium halides as for example those prepared from ortho, meta, and para bromanisole. The magnesium complexes thus obtained are hydrolyzed and dehydrated at the same time with an acidic agent, such as ammonium chloride solution, dilute acetic acid, dilute mineral acids, and the like, to the N-tertiary-(2-alkoxyphenyl)-1,4,5,6-tetrahydropyridines and these are then reduced to N- tertiary-(2-alkoxyphenyl)-piperidines. The reduction is conveniently carried out catalytically with hydrogen in the presence of a metal catalyst such as platinum or nickel. The resultant products may be dealkylated with a dealkylating agent, for example, hydrobromic acid or aluminum chloride and the like, to form the corresponding hydroxy compounds which in turn may be acylated with acid anhydrides or chlorides in the usual manner. The following scheme illustrates the above reactions

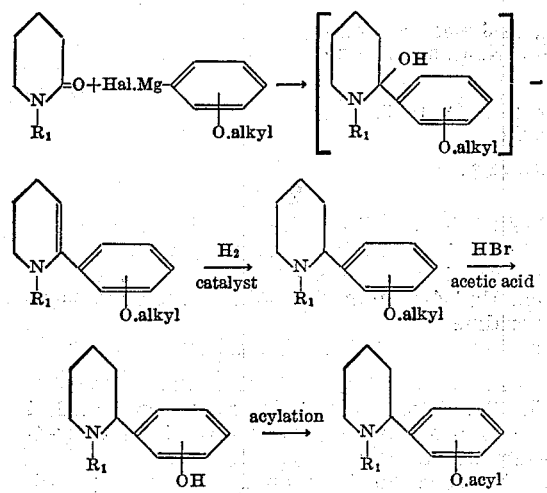

In the above reaction scheme, Hal. corresponds to a halogen atom. The salts of the bases as for example the hydrochlorides, hydrobromides, sulfates, lactates, citrates, ethanesulfonates, and gluconates can be prepared by direct neutralization in the usual manner.

The compounds are characterized by analgesic and spasmolytic activity and may also serve as intermediates in the manufacture of medicinal drugs.

The following examples illustrate my invention:

Example 1

(a) In a three-necked flask provided with a ground sealed stirrer, dropping funnel and reflux condenser, 0.2 mole of magnesium and 50 cc. of dry ether are placed. To this is added 0.2 mole of p-bromanisole in 50 cc. of ether. If the reaction is slow in starting 0.5 cc. of methyliodide may be added. After the complete addition of the p-bromanisole the ether solution is refluxed for one hour to complete the reaction. To the mixture 0.2 mole of 1-methyl-2-piperidone in 100 cc. of ether is added dropwise. After the complete addition the mixture is refluxed with stirring for eight hours during which times the gummy complex at first formed becomes solid. This is decomposed with dilute hydrochloric acid and the ether layer separated, the aqueous layer is saturated in sodium carbonate, extracted with ether and the ether solutions combined. The ether solution is dried and the ether removed by distillation. On fractionation in vacuum 1-methyl-2-(p-methoxyphenyl)-1,4,5,6-tetrahydropyridine is obtained having a B. P. of 125° C. at 3 mm. By passing dry hydrochloric acid gas into a dry ether solution of the base the hydrochloride is obtained having a M. P. of 175° C. In a similar manner using o-bromanisole, 1-methyl-2-(o-methoxyphenyl)-1,4,5,6-tetrahydropyridine, B. P. 118–124° C. at 3 mm.; using m-bromanisole, 1-methyl-2-(m-methoxyphenyl)-1,4,5,6-tetrahydropyridine, B. P. 142° C. at 6 mm.; and using 2-bromo-6-methoxynaphthalene, 1-methyl-2-(6'-methoxynaphthyl-2')-1,4,5,6-tetrahydropyridine, B. P. 175° C. at 2 mm., is obtained.

In the above compounds the dehydration of the tertiary alcohol formed in the reaction occurs during the decomposition of the Grignard complex. In some cases the tertiary alcohol is separated by the above procedure in which case the dehydration can be effected by heating under vacuum with potassium hydrogen sulfate.

(b) 20 g. of 1-methyl-2-(p-methoxyphenyl)-1,4,5,6-tetrahydropyridine are dissolved in 100 cc. absolute alcohol, 5 g. of Raney nickel added and the reduction carried out under pressure of 50 pounds at room temperature. The pressure and temperature are not critical and may vary up to 4000 pounds and 100° C. The quantitative amount of hydrogen is absorbed rapidly and when complete the catalyst is filtered off and the alcohol removed from the filtrate. Crude 1-methyl-2-(p-methoxyphenyl)-piperidine is dissolved in ether, dry hydrochloric acid gas passed when the hydrochloride separates out and white crystals appear, M. P. 170° C. In a similar manner 1-methyl-2-(o-methoxyphenyl)-piperidine hydrochloride and 1-methyl-2-(m-hydroxyphenyl)-piperidine hydrochloride are prepared from the corresponding tetrahydropyridine base.

(c) 20 g. of 1-methyl-2-(p-methoxyphenyl)-piperidine base are dissolved in 50 cc. hydrobromic acid and 60 cc. of 48% hydrobromic acid in acetic acid are added. The solution is refluxed for four hours, distilled in vacuum to remove the acetic acid and excess hydrobromic acid. The residue is crystallized from alcohol. In this manner 1-methyl-2-(p-hydroxyphenyl)-piperidine hydrobromide, M. P. 231° C., is obtained. In a similar manner 1-methyl-2-(o-hydroxyphenyl)-piperidine hydrobromide; 1-methyl-2-(m-hydroxyphenyl)-piperidine hydrobromide; and 1-methyl-2-(6-methoxynaphthyl-2)-piperidine hydrobromide are obtained.

(d) 20 g. of 1-methyl-2-(p-hydroxyphenyl)-piperidine hydrobromide are dissolved in 100 cc. of water and the solution saturated with potassium carbonate. The separated piperidine base is extracted with ether, the ether solution dried and the ether removed by distillation. The free phenolic base is dissolved in 50 cc. of dry pyridine and 9 g. of dimethylcarbamyl chloride are added. The solution is heated on a water bath for three hours and a further 9 g. quantity of dimethylcarbamyl chloride are again added and the solution heated for another hour. The solvent is then removed in vacuum, the residue dissolved in water and the solution made alkaline with sodium hydroxide. The dimethylcarbamyl ester is extracted with ether, the ether removed and the residue crystallizes. The ester, dissolved in dry ether and treated with hydrochloric acid gas, yields 1-methyl-2-(p-dimethylcarbamoxyphenyl)-piperidine hydrochloride, which melts at 145° C. In a similar manner using phenylmethylcarbamyl chloride, 1-methyl-2-(p-phenylmethylcarbamoxyphenyl)-piperidine hydrochloride, M. P. 140° C., is obtained; and using acetylchloride as the acylating agent, 1-methyl-2-(p-acetoxyphenyl)-piperidine hydrochloride, M. P. 188° C., is obtained.

In a manner similar to the above, using 1-methyl-2-(m-hydroxyphenyl)-piperidine the corresponding 1-methyl-2-(m-dimethylcarbamoxyphenyl)-piperidine hydrochloride, melting at 189° C.; and using 1-methyl-2-(6'-hydroxynaphthyl- 2')-piperidine, the compound 1-methyl-2-(6'-dimethylcarbamoxynaphthyl-2')-piperidine hydrochloride, M. P. 220° C., is obtained.

*Example 2*

(a) In the manner and quantities of reactants, as given in Example 1, using 1-methyl-4-piperidone, instead of 1-methyl-2-piperidone, and ortho, meta, and para bromanisole respectively, the following compounds are prepared:

1-methyl-4-hydroxy-4-(o-methoxyphenyl)-piperidine, B. P. 150° C./5 mm., M. P. 117° C.
1-methyl-4-hydroxy-4-(m-methoxyphenyl)-piperidine, B. P. 162° C./3 mm., M. P. 112° C.
1-methyl-4-hydroxy-4-(p-methoxyphenyl)-piperidine, B. P. 115° C./1 mm., M. P. 116° C.

The dehydration of the carbinol formed on decomposing the magnesium complex in these cases does not occur spontaneously.

One mole of 1-methyl-4-hydroxy-4-(o-methoxyphenyl)-piperidine is mixed with two moles of anhydrous potassium hydrogen sulfate in a flask and heated under vacuum at 10 mm. for five minutes at 170° C. The flask is cooled with water, treated with water to dissolve the contents and the solution is then saturated with potassium carbonate and extracted with ether. The ether solution is dried and the ether removed. In this manner 1-methyl-4-(o-methoxyphenyl)-1,2,5,6-tetrahydropyridine, B. P. 130° C./4 mm., is obtained. In a similar manner to the above 1-methyl-4-hydroxy-4-(m-methoxyphenyl)-piperidine yields 1-methyl-4-(m-methoxyphenyl)-1,2,5,6-tetrahydropyridine, B. P. 127° C./2 mm.; and 1-methyl-4-hydroxy-4-(p-methoxyphenyl)-piperidine yields 1-methyl-4-(p-methoxyphenyl)-1,2,5,6-tetrahydropyridine which forms a hydrochloride melting at 178° C.

(b) By the procedure as described in Example 1-(b), hydrogenation of 1-methyl-4-(o-methoxyphenyl)-1,2,5,6-tetrahydropyridine gives 1-methyl-4-(o-methoxyphenyl)-piperidine yielding a hydrochloride melting at 242° C. 1-methyl-4-(m-methoxyphenyl)-1,2,5,6-tetrahydropyridine yields 1-methyl-4-(m-methoxyphenyl)-piperidine; and 1-methyl-4-(p-methoxyphenyl)-1,2,5,6-tetrahydropyridine yields 1-methyl-4-(p-methoxyphenyl)-piperidine.

(c) In a manner similar to that described in Example 1-(c), 1-methyl-4-(o-methoxyphenyl)-piperidine yields 1-methyl-4-(o-hydroxyphenyl)-piperidine hydrobromide, M. P. 180° C.; 1-methyl-4-(m-methoxyphenyl)-piperidine gives 1-methyl-4-(m-hydroxyphenyl)-piperidine hydrobromide, M. P. 206° C.; and 1-methyl-4-(p-methoxyphenyl)-piperidine yields 1-methyl-4-(p-hydroxyphenyl)-piperidine hydrobromide, M. P. 210° C.

(d) By the procedure described in Example 1-(d), 1-methyl-4-(o-hydroxyphenyl)-piperidine yields 1-methyl-4-(o-dimethylcarbamoxyphenyl)-piperidine hydrochloride, melting at 222° C.; 1-methyl-4-(m-hydroxyphenyl)-piperidine yields 1-methyl-4-(m-dimethylcarbamoxyphenyl)-piperidine hydrochloride; and 1-methyl-4-(p-hydroxyphenyl)-piperidine yields 1-methyl-4-(dimethylcarbamoxyphenyl)-piperidine hydrochloride, melting at 246° C.

*Example 3*

(a) 1-ethyl-4-piperidone prepared according to the method described in J. A. C. S. 55, 1233, (1933) is obtained as a liquid boiling at 78° C./15 mm.

In a manner described in Example 1, 1-ethyl-4-piperidone is reacted with magnesium and p-bromanisole and 1-ethyl-4-hydroxy-4-(p-methoxyphenyl)-piperidine, boiling at 160° C./2 mm., M. P. 97° C., is obtained. On dehydration with potassium acid sulfate, 1-ethyl-4-(p-methoxyphenyl)-1,2,5,6-tetrahydropyridine is obtained which forms a hydrochloride melting at 98° C.

(b) By reducing 1-ethyl-4-(p-methoxyphenyl)-1,2,5,6-tetrahydropyridine in alcohol by means of Raney nickel and hydrogen gas at 50 pounds pressure in the manner described in Example 1-(b), 1-ethyl-4-(p-methoxyphenyl)-piperidine, B. P. 116° C./1 mm., is obtained.

(c) In the manner described in Example 1-(c) and 1-(d), 1-ethyl-4-(p-methoxyphenyl)-piperidine yields 1-ethyl-4-(p-dimethylcarbamoxyphenyl)-piperidine hydrochloride, M. P. 208° C.

The products of this invention are also prepared starting directly with the N-tertiary-(2 or 4)-C-substituted homocyclyl-4-hydroxy piperidines. These piperidines are dehydrated and reduced to yield the products described above.

The dehydrated derivatives of N-tertiary-(2 or 4)-C-substituted homocyclyl-4-hydroxy piperidines can be employed directly as starting materials, in which case only the reduction step is necessary to yield the desired end products heretofore disclosed.

Quaternary derivatives such as the methiodide, ethobromide, and the like may also be prepared by first treating the base in an alcohol solution with a compound such as methyl or ethyl bromide and precipitating the salt.

What I claim is:

1. Piperidines selected from the group consisting of those corresponding to the following general formula and their acid addition salts

$R_1$ being a lower alkyl radical, and one of Z and Y being hydrogen while the other represents a member from the group consisting of hydroxyphenyl, alkoxyphenyl, acyloxyphenyl, hydroxynaphthyl, alkoxynaphthyl and acyloxynaphthyl radicals.

2. Compounds according to claim 1 in which the substituent is carried in the 2-position.
3. Compounds according to claim 1 in which the substituent is carried in the 4-position.
4. Compounds according to claim 1 in which $R_1$ represents ethyl.
5. Compounds according to claim 1 in which $R_1$ represents methyl.
6. 1-methyl-2-(m-methoxyphenyl)-piperidine.
7. 1-methyl-4-(p-methoxyphenyl)-piperidine.
8. 1-methyl-4-(p-dimethylcarbamoxyphenyl)-piperidine.

JOHN LEE.

No references cited.